United States Patent
Ravid et al.

(10) Patent No.: US 6,622,137 B1
(45) Date of Patent: Sep. 16, 2003

(54) SYSTEM AND METHOD FOR BUSINESS DECISION IMPLEMENTATION IN A BILLING ENVIRONMENT USING DECISION OPERATION TREES

(75) Inventors: Liran Ravid, Raanana (IL); Oren Avital, Haifa (IL)

(73) Assignee: Formula Telecom Solutions Ltd., Herzliya (IL)

( * ) Notice: Subject to any disclaimer, the term of this patent is extended or adjusted under 35 U.S.C. 154(b) by 511 days.

(21) Appl. No.: 09/637,933

(22) Filed: Aug. 14, 2000

(51) Int. Cl.[7] .............................................. G06F 17/00
(52) U.S. Cl. ........................... 706/47; 707/510; 705/40
(58) Field of Search ........................... 706/47; 707/510; 705/40

(56) References Cited

U.S. PATENT DOCUMENTS

| | | | |
|---|---|---|---|
| 5,274,749 A | 12/1993 | Evans | |
| 5,481,649 A | 1/1996 | Birdwell et al. | |
| 5,530,957 A | * 6/1996 | Koenig | 707/100 |
| 5,596,502 A | 1/1997 | Koski et al. | |
| 5,659,727 A | * 8/1997 | Velissaropoulos et al. | 707/2 |
| 5,664,181 A | * 9/1997 | Velissaropoulos et al. | 707/102 |
| 5,692,220 A | 11/1997 | Diamond et al. | |
| 5,696,884 A | 12/1997 | Heckerman et al. | |
| 5,717,865 A | 2/1998 | Stratmann | |
| 5,732,397 A | 3/1998 | DeTore et al. | |
| 5,742,776 A | 4/1998 | Toda | |
| 5,758,026 A | 5/1998 | Lobley et al. | |
| 5,774,121 A | 6/1998 | Stiegler | |
| 5,787,283 A | 7/1998 | Chin et al. | |
| 5,844,817 A | 12/1998 | Lobley et al. | |
| 5,870,730 A | 2/1999 | Furuya et al. | |
| 5,875,285 A | 2/1999 | Chang | |
| 5,940,816 A | 8/1999 | Fuhrer et al. | |
| 5,953,707 A | 9/1999 | Huang et al. | |
| 5,978,786 A | 11/1999 | Eyles | |
| 5,983,220 A | 11/1999 | Schmitt | |
| 5,999,923 A | 12/1999 | Kowalski et al. | |
| 6,009,420 A | 12/1999 | Fagg, III et al. | |
| 6,012,051 A | 1/2000 | Sammon, Jr. et al. | |
| 6,029,138 A | 2/2000 | Khorasani et al. | |
| 6,049,794 A | 4/2000 | Jacobs et al. | |
| 6,098,062 A | 8/2000 | Janssen | |
| 6,317,492 B1 | * 11/2001 | Johnson | 379/201.04 |
| 6,480,839 B1 | * 11/2002 | Whittington et al. | 707/3 |

* cited by examiner

*Primary Examiner*—George B. Davis
(74) *Attorney, Agent, or Firm*—AlphaPatent Associates Ltd.; Daniel J. Swirsky

(57) ABSTRACT

A decision operation tree ("DO Tree") according to the present invention is a logical tree representation of decision making rules and actions instituted according to those rules. In preferred embodiments of the invention, one or more DO Trees are tailored to serve a user's rating and billing system needs. According to the present invention, Do Trees are comprised of a plurality of nodes and branches, which branches connect the nodes together in a descending relationship. Any node may have defined for it one or more actions (whose implementation can be prioritized or ordered) which are triggered whenever the node is reached. Those nodes having branches stemming ("descending") from them have two parameters, a Decision Attribute and a Branching Type, which defines the node's relationship with its descending branches. Upon occurrence of the predefined event, the method includes proceeds from node to node, and optionally performs one or more actions in each node. Systems according to the present invention include a storage media, a processor, and software run by the processor. One or more DO Trees are stored on the storage media. Upon the occurrence of a predefined event, the software of the system performs the decisions and actions dictated by one or more of the stored DO Trees.

22 Claims, 6 Drawing Sheets

Fig. 1
Prior Art

First Generation Rate Table

|         | Peak    | Off Peak |
|---------|---------|----------|
| QoS 1   | $1/Min  | $.8/Min  |
| QoS 2   | $.7/Min | $.6/Min  |

Second Generation
Multi-Dimensional Rate Table

| Rule 1 | (Peak) • (QoS 1) • (0-100 Min) → $1/Min |
| Rule 2 | (Peak) • (QoS 2) → $.8/Min |
| Rule 3 | (QoS 3) → $.5/Min |
| Rule 4 | Other → $.4/Min |

SYSTEM AND METHOD FOR BUSINESS DECISION IMPLEMENTATION IN A BILLING ENVIRONMENT USING DECISION OPERATION TREES

FIELD OF THE INVENTION

The present invention relates to the field of methods and systems for automated decision making.

BACKGROUND OF THE INVENTION

Disclosed is a system and method for improved modeling of business decision implementation in Customer Care and Billing (CC&B) and Operation Support Systems (OSS). The system and method facilitates the processes whereby a company designs an electronic rating, business or other decision-handling engine of a Billing System or other such system. Currently, the task of designing such an engine is one of the tougher challenges in the construction of a competitive business CC&B and OSS. As the Business Engine is typically the core of a company's electronic billing system, it needs to be intuitive to use and efficient, scalable and platform independent, yet still able to yield real time outputs in generic form such that it may be applied to a variety of business models. The continuing emergence of next generation communication services and the strong competition between service providers makes new innovative marketing services and rating schemes an everyday event. Thus, there is a need in the art for implementing flexible and generic automation of business decisions for CC&B and OSS.

Prior art systems and methods commonly employed a "Rate Table" to model business decisions and a "Rating Engine," such as a simple software program, to apply the decisions on a specific event. The Rate Table scheme is currently widely used in many legacy billing systems. A Rate Table is based on the premise that there are few monitored business parameters (usually no more than three), which can be used to select the right "rate," generally any value of interest, from the table. This method is typically focused on implementing a rating decision rather then a full business decision, where the rating decision is merely dealing with applying prices or fees ("rates"), for a combination of several parameters. The Rating Engine selects the right "rate(s)" according to the event parameters. FIG. 1 generally depicts an exemplary Rate Table, labeled "First Generation Rate Table". The figure presents an example of a rating decision relating to peak and off-peak (Time of Day) cellular phone airtime fees on one hand, and to Quality of Service (QoS) measurement on the other hand. As seen in the figure, the table is two-dimensional, meaning, it depends on two business parameters—Time of Day and QoS. The combination between Time of Day and QoS parameters determines the desired rate(s). To determine the appropriate airtime rate, one just looks up the corresponding entry in the table for the appropriate Time of Day (Peak or Off Peak) and Quality of Service (QoS1 or QoS2).

There are times when the Rating Engine applies different rates for different segments of the event according to the Rate Table parameters. The order in which the event is segmented may result in different rates for the same Event. An important enhancement of the Rate Table approach can reside in prioritizing the different business parameters. (e.g. QoS has higher priority than Time of Day, thus the Event will be segmented first according to QoS and only then each segment will be divided by Time of Day).

The advantage of the Rate Table method is its simplicity and ease of use in representing non-complex business decisions, or more specifically rating decisions. By all respects, for one or two dimensions, it is equally simple to visually present a Rate Table to the, end user of the system and to design a Rating Engine to support it. Unfortunately, a Rate Table has fixed business parameters with a fixed number of dimensions that often makes it difficult to define a rating method based on new parameter without the painful customization involving re-coding part of the billing system. These drawbacks make it merely suitable for certain application types that are relatively simple in nature.

To address the problems inherent in the Rate Table, the prior art has developed a variation of the Rate Table that expands the table to greater power and flexibility. The new concept is that of a multi-dimensional or n-dimensional Rate Table. An example of such a method is represented in FIG. 1 labeled as a "Second Generation Multi-Dimensional Rate Table". Due to the fact that it is extremely difficult to visually represent more than two dimensions in a table, the multi-dimensional Rate Table uses a set of rules to decide the right action. Each rule represents a single combination of the of 1 or more of the 'n' parameters. These series of rules dictate actions to be taken whenever certain relationships exist between any number of business parameters ("dimensions") from a predetermined list of business parameters.

While the use of a second generation multi-dimensional Rate Table creates more flexibility and power than first generation Rate Tables, this method creates new drawbacks. The most profound one is the lack of ability to visually depict an n-dimensional table when "n", the number of dimensions or parameters, grows large. While it may be solved by converting a table-cell (or group of cells) in a multi-dimensional table into a rule, this makes the implementation of a rating decision exceedingly difficult. Furthermore, logically converting business decisions into such a table of rules is not intuitive and it is ultimately difficult to tell whether all rating options are covered. Moreover, the major drawback of the Rate Table remains—both methods are particularly useful in implementing only a rating decision (economic) as opposed to business decision. In other words, business decisions that result in more than purely economic outcomes can not be presented in those methods. Some such potential uses for CC&B or OSS engines include: bonuses (monetary or not), discounts, loyalty credits, provisioning of external devices and activation or de-activation of services. In most cases this drawback leads to complex solution of those business decisions, outside the scope of the Rate Table.

Thus, there remains a need in the art for an improved decision system and method and in particular for use in CC&B and OSS, that overcomes the above-described and other disadvantages inherent in the prior art.

SUMMARY OF THE INVENTION

The quest for new techniques for a generic business decision model and engine has led to the system and method of the present invention which utilizes a Decision Operation Tree, or a DO Tree™. This third generation approach not only solves the above discussed and other disadvantages of the prior art, but also allows the integration of various decision making rules into one system. In embodiments of the present invention, the DO Tree is advantageous over Rate Tables and multi-dimensional rate tables in that it facilitates the application of decision engines into a variety of areas which, prior to the present invention, were usually considered to lie outside the scope of Rate Table methodologies.

A DO Tree according to the present invention is a logical tree representation, comprised of Nodes and Branches, of decision making rules and actions instituted according to those rules. In preferred embodiments of the invention, one or more DO Trees are tailored to serve a user's rating and billing system needs. Methods according to the present invention include representing a series of decisions necessitated by the occurrence of a predefined event with a DO Tree as herein described. Upon occurrence of the predefined event, the method includes proceeding from Node to Node, and optionally performing one or more actions in each Node, in the DO Tree according to the rules the DO Tree provides.

Systems according to the present invention include a storage media, a processor, and software run by the processor. One or more DO Trees according to the present invention are stored-on the storage media. Upon the occurrence of a predefined event, the software of the system performs the decisions and actions dictated by, one or more of the stored DO Trees. The present invention, however, is not dependent on any particular storage media, processor or other hardware.

According to the present invention, Do Trees are comprised of a plurality of Nodes and Branches which connect the nodes together in a progressive relationship. Any node may have defined for it one or more "Actions" (whose implementation can be prioritized or ordered) which are triggered whenever the Node is reached. Those Nodes having Branches stemming ("descending") from them have two parameters, a Decision Attribute and a Branching Type, which defines the Node's relationship with its descending Branches. Conversely, each Branch is defined by a parameter called a Decision Value. For each Node having descending Branches, the specified Decision Attribute defines what type of attribute the Node's branches's Decision Value parameters are referring to. Thus, the interaction of these two paramters determine what branch or branches should be followed to the next Node. Additionally, each Node having Branches has specified a Branching Type parameter. The Branching Type parameter also helps chose which Branches are followed in the DO Tree. This parameter can have various values, including: Step, Tier, and Period. Each one of these branching types dictate different splitting actions when the DO tree is evaluated for a specific event.

The constituent components of DO Trees and systems and methods according to the present invention will be discussed in more detail below with respect to the drawings and description of several embodiments of the present invention. It should be understood that the forthcoming description is merely illustrative and is by no means limitative of the invention as claimed.

BRIEF DESCRIPTION OF THE DRAWINGS

FIG. 1 is a diagram of an exemplary first generation two-dimensional rate table, and a second generation multi-dimensional rate table as known in the prior art.

DETAILED DESCRIPTION OF THE INVENTION

Figure 2:
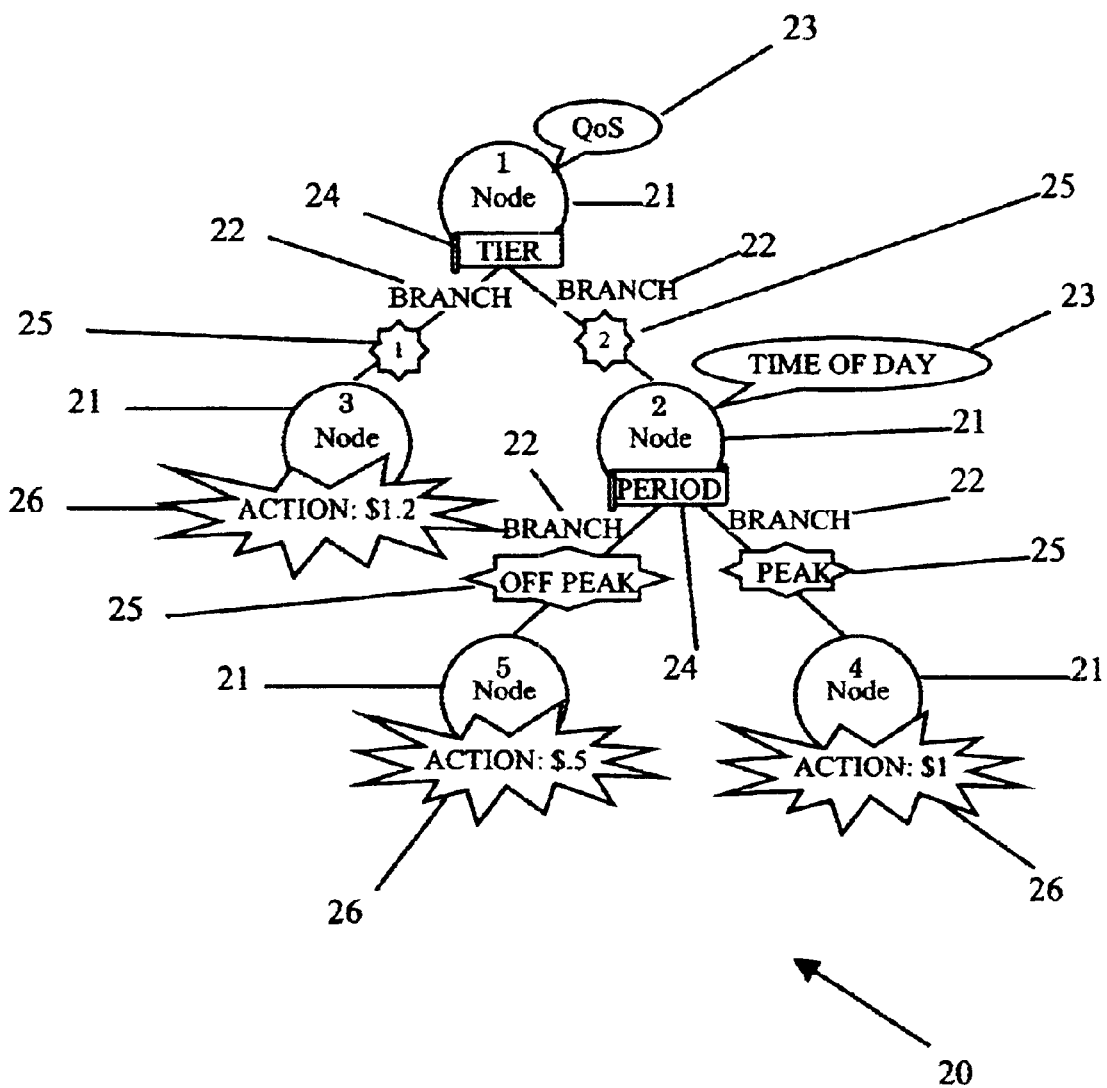
FIGS. 2 and 3 are schematic diagrams of decision operation trees according to embodiments of the present invention.

A DO Tree according to the present invention is a logical tree representation tailored to serve a user's decision making needs. In their implementation, such a decision making system and method has particular application to the field- of rating and billing systems. While the following detailed description of embodiments of the invention deal with examples from this field, it will be readily appreciated by one skilled in the art that the present invention has advantageous uses in various applications.

The basic components of each DO Tree according to the present invention are Nodes and Branches. Each DO Tree is directed toward handling the decisions in response to a particular event by analyzing which, if any, actions should be triggered by the event.

A Node is a vertex in the DO Tree, which has zero or more Branches descending from it and connecting it to one .or more other Nodes. A Node that has one or more Branches stemming from it is characterized by a Decision Attribute and Branching Type.

A Node may also have several "Actions" attached to it. These actions can include, for example, crediting and debiting of monetary and non-monetary accounts, triggering internal provisioning actions such as activation or deactivation of internal services, triggering external provisioning actions, sending messages to customers. A scripting tool allows a user to define complex or other customized actions. Furthermore, multiple actions within a Node can be sequenced such that they are performed in a particular order, performed only if a previous action failed, or performed using a value generated by the previous action. Such actions can vary from simple calculations to initializations of external processes (such as a user defined software script or the initialization of a second DO Tree).

A Branch forms the linkage between two Nodes. A Branch will hold a Decision Value, whether singular or a range of values, of a type corresponding to its parent Node's Decision Attribute. These values can be numeric or alphanumeric depending on the Decision Attribute (e.g., '0–10' may represent duration in seconds, 'Peak' may represent a billing code, etc.).

The Decision Attribute of each Node having descending Branches determines what parameter should be considered in this-Node and defines the value type of the Branches that stem from the Node. In this, manner, the Decision Attribute, working with the values assigned to each Branch, dictates-the logical flow down the DO Tree. For example, a Node containing event duration in minute' as its Decision Attribute will have branches stemming from it with values representing a specific duration in minutes or a range of minutes.

The Branching Type of each Node defines the manner in which the DO Tree algorithm will execute the business decision on a specific event. More specifically, the Branching Type dictates the segmenting method of the Node including what branches are proceeded down and what parameters and values are passed to the Nodes at the end of those Branches. Exemplary Branching Types which will be discussed in more detail below include: Step, Tier, and Period.

As described above, an Action is -an operation performed by a Node. Each Node holds the definition of zero, one, or multiple Actions that will be triggered when the Do Tree algorithm reaches that particular Node. Each Action holds an "Action Value" that determines an outcome or output value of that specific action. The Actions provide the capability of implementing the outcome of the decisions) proscribed by the method and system of the present invention. As will be illustrated with respect to the below examples, a wide range of "outcome types" can be provided for within a single DO Tree or Node.

Systems according to the present invention employ decision engines, usually in the form of software, which implement actions in response to events as dictated by the DO Tree related to that event. The system then operates according to the logic provided by the related DO Tree; as described with respect to the method of the present invention, to implement the proper decision defined by the DO Tree. While a system according to the present invention, such as a real-time computerized billing system, acts in response to pre-defined events, each such event triggers Actions to implement decisions dictated by the DO Tree. A DO Tree is dependent upon a certain Event and is only evaluated when that specific "Triggering Event" occurs. (e.g., a customer using an Internet access service can be an event which enters the billing system and triggers a DO Tree to implement a specific billing process). As a DO Tree logically defines the decisions to be made and actions to be taken in response to a triggering event, the method of the present invention, after the definition of each DO Tree, involves a relatively straightforward operation in a recursive manner in response to the triggering event. In embodiments of the present invention, the steps taken in response to such a triggering event are:

1. Start with the first Node of the DO Tree, called a Root Node. Pass parameters (a list of attributes and their values) relating to the Triggering Event to the Root Node. These "Event parameters" may be, for example, the "customer id," "start date and time," "quality of service," etc. Some of the Event parameters will be used to determine the decision performed by the DO Tree, other parameters will be used in conducting actions, and still others for both (as the below examples will show);
2. Perform the current Node's Actions (if any exist) one by one according to the Action relationships (their specified order) and the passed Event parameters;
3. Locate the particular Event parameters that correspond to the Decision Attribute of the Node. This value will be referred to as "Decision Attribute Value";
4. Branch to the next Node(s) according to the Decision Attribute Value that corresponds to the Branch(es) value (s) and the Node's Branching Type. Pass the Event parameters to the next Node(s);
5. Repeat steps 2 through 4 until the current Node has no more Branches.

As described above, the Branching Type parameter relating to each Node having descending Branches defines the type of segmentation action (deciding which Branches to take) that will be performed after evaluating the Decision Attribute at a given Node. According to preferred embodiments of the present invention, valid Branching types include Step, Tier, and Period, and may refer to either discrete (singular) values or continuous (range) values.

The "Step" Branching type divides an event between the Branches according to the Branch values., The Node's Decision Attribute that the Step Branching type refers to has always a continuous numeric value (as opposed to discrete numeric value or non-numeric value). Example 1 discusses how such a step Branching type would operate.

EXAMPLE 1

Node A has a Decision Attribute of cellular call duration and a Step Branching Type. Branches 1A, 2A and 3A stem from Node A. The values of Branches 1A, 2A and 3A, with respect to the Decision Attribute, are as follows:

Branch 1A: first 0–10 seconds of time
Branch 2A: second 0–10 seconds of time
Branch 3A: any time above 20 seconds An event (e.g., a cellular call record) having a Decision Attribute (duration) of 17 seconds will be branched under the above Step Branching Type using the above method as follows:

first 10 seconds will be sent to Branch 1A, and
remaining 7 seconds will be sent to Branch 2A.

The "Tier" Branching type differs from the Step Branching type in that it chooses a single Branch to proceed along away from the Node (i.e., the event is not divided among multiple Branches as is possible with Step Branching). The attribute that the Tier method refers to can have a discrete or continuous numeric value. Example 2 discusses how such a Tier Branching Type would operate.

EXAMPLE 2

Node B is like Node A in that it has a Decision Attribute of cellular call duration. Node B, however, has a Tier Branching Type Branches 1B, 2B and 3B stem from Node B. The values of Branches 1B, 2B and 3B, with respect to the Decision Attribute, are as follows:

Branch 1B: 0–10 seconds duration
Branch 2B: 10–20 seconds duration
Branch 3B: above 20 seconds duration An event (e.g., a cellular call record) having a Decision Attribute (duration) of 17 seconds reaching Node B will be Branched under the Tier Branching Type as follows:

all 17 seconds will be sent to Branch 2B.

The "Period" Branching Type causes an event to be segmented between Branches according to time of day. Time of day for each Branch is represented according to a Period-Range, which contains a start time and an end time. An event that spans more than one Period Range will be segmented according to the period set and every period will get a certain percentage of the session.

EXAMPLE 3

Node C has a Decision Attribute of cellular call duration and a Period Branching Type. Branches 1C and 2C stem from Node C. The values of Branches 1C and 2C with respect to the Decision Attribute are as follows:

Branch 1C: Peak Period (Weekday 08:00–12:00)
Branch 2C: Off-peak Period (All other times of day)

For an event (e.g., a cellular call record) of 60 minutes duration which started on Monday at 7:50am, the event will be Branched as follows according to the Period Branching Type:

10 minutes will be sent to Branch 2C, and
50 seconds will be sent to Branch 1C.

Referring to FIG. 2, there is depicted an exemplary DO Tree according to embodiments of the present invention. The tree is comprised of Nodes 21 (identified individually as 1, 2, 3, 4 and 5), Branches 22, Decision Attributes 23, Branching Types 24, and Decision Values 25. The following decision rule can be implemented easily by a DO Tree:

"Internet Access premium service will be rated $1.20 per hour when the Quality of Service ("QoS") is of type 1.

When the QoS is of type 2, the rate will be $0.50 for Off Peak times and $1 for Peak times (Peak and off Peak times are defined separately)."

Referring to FIG. 2, which illustrates the DO Tree 20 solving the above decision rule, Node 1, the root Node, has a Tier Branching Type 24 and Node 2 has a Period Branching Type 24. Node 1 has a Decision Attribute 23 of QoS while Node 2 has a Decision Attribute 23 of Time of Day. Nodes 3–5 do not have a Branching Type 24 or a Decision Attribute 23 as they are "leaf" Nodes (they have no Branches 22 stemming from them). Nodes 3–5, however, each have Actions 26 that set the appropriate billing rate as determined by the business rule.

According to FIG. 2 and the business rule it implements, a Customer X could purchase Internet Access Premium Service and use the service for five hours with QoS equal to 2. Out of the five hours, if two were in Peak time where three were in Off Peak time, the illustrated DO Tree according to the present invention would dictate the following steps:

1. The root Node (Node 1) is fetched and the process looks for Node actions. No Action 26 to perform in the root Node.
2. The Decision Attribute 23 of the root Node is QoS and therefore it is compared against the QoS attribute value (QoS=2) which is passed to the root node at the DO Tree's initialization.
3. The first Branch's Decision Value 25 (1) is checked against the attribute value (2) and produces a negative answer.
4. The second Branch's Decision Value 25 (2) is checked against the attribute value (2) and produces a positive answer. Using the Tier Branching Type 24, the process continues down the second Branch to Node 2.
5. Node 2 is fetched and the process looks for Node Actions 26. There is no Action 26 to perform in Node 2.
6. The Decision Attribute 23 of Node 2 is the Time of Day. In addition, the Branching Type 24 of the. Node is Period. The process segments the event into Peak and Off-Peak periods according to the Time of Day parameter values passed to the Node. According to the Period branching method, two hours are sent down the Branch to Node 4, and three hours are sent to Node 5.
7. Node 4 is fetched and the process looks for Node actions 26. There is an-Action 26 indicating a fee generation of $1 per hour sent to the node. $1.00 is multiplied by the event hours passed to Node 4 (2 hrs. peak time) giving an output of $2.00.
8. Node 5 is fetched and the process looks for Actions 26. There is an action of $0.50 per hour. $0.50 is multiplied by the event hours (3 is peak time) giving an output of $1.50.
9. The system ends the implementation of the DO Tree as there are no more branches leading from the active Nodes 4 and 5.

Total actions for this event accumulate a $3.50 charge to the account of Customer X.

Figure 3:
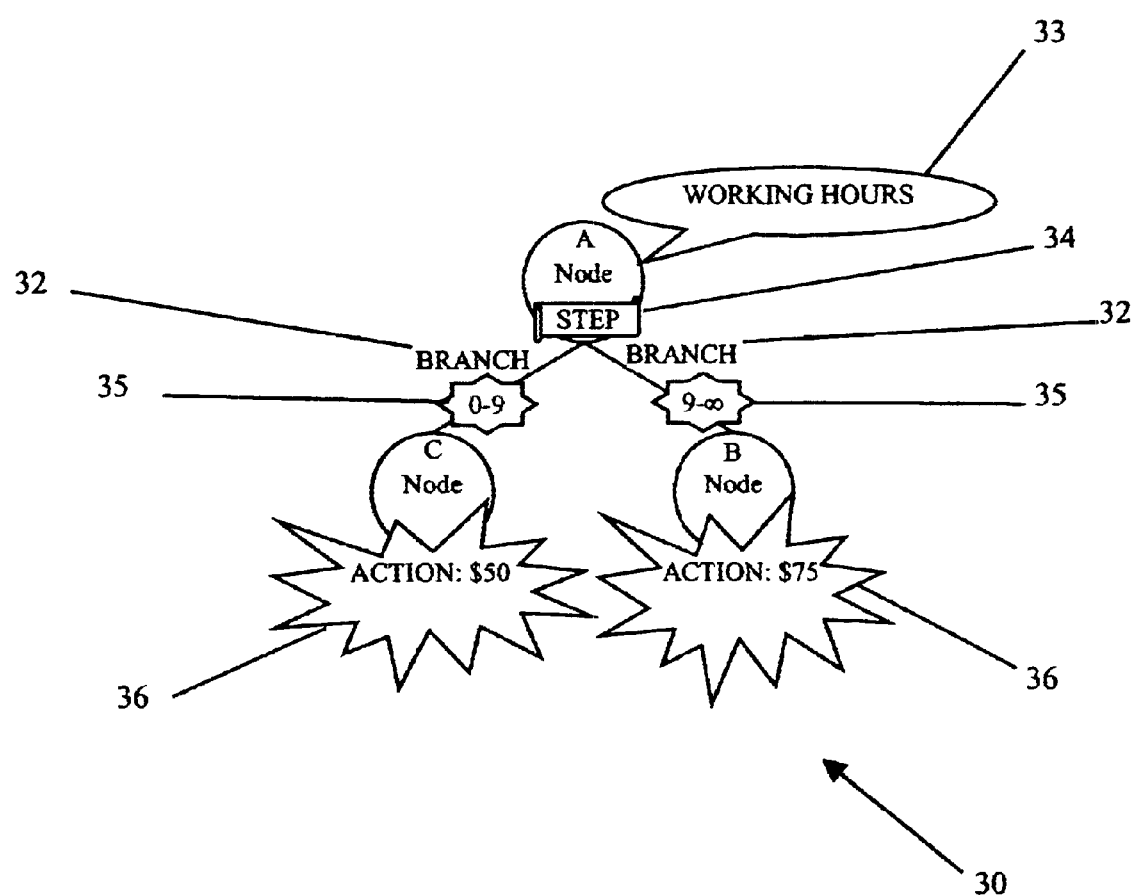

FIG. 3 provides a second example of a DO Tree according to embodiments of the present invention with respect to a fictional "Company Y". If Company Y desires to automate a rule saying "For each day of work the employee will get $50 per hour for the first 9 hours and $75 per hour for each hour above 9," an appropriate DO Tree can be built with billing software according to the present invention. This DO Tree in essence will be responsible to rate the mentioned business rule, namely, rate the compensation for each employee. FIG. 3 is a DO Tree 30 which implements the above business rule.

In FIG. 3, Node A (the root Node) has a Decision Attribute 33 of "Working Hours" and a Branching Type 34 of Step. On the Branches 32 leading down from Node A there are values 35. These values 35 correspond to the hours worked by the employee in question. (This is known because the Decision Attribute of the Node is "Working Hours" i.e., it describes the value type of the Branches 32). Node B' has an Action 36 of $75 per hour worked and Node C' has an Action 36 of $50 per hour.

Consider event E indicating that employee M worked today for 13 hours, we have the following event scenario:

Event: Employee hours worked.
Attributes:
  1. Employee Name: M
  2. Date: Jun. 30, 2000
  3. Working Hours: 13

Billing software utilizing DO Trees according to systems and methods of the present invention initialize the DO Tree 30 depicted by FIG. 3 and passes the Working Hours, parameter with a value of 13 to the root Node A' which has no Actions 36. A' has a Step branching type 34 determined according to the value of the "Working Hours" decision attribute 33. The Step values associated with the Branches leading to B' and C' cut the event into two. Nine hours continue with the Branch going to Node C', while the other four hours continue to Node B'.

The 9 hours that reach Node C' are operated on by an action in the Node which outputs a value $50 per hour passed to the Node. Thus, the billing software will perform the action $50/hr*9hr=$450. The 4 hours that reach Node B' likewise encounter the action $75/hr*4hr=$300. The total earnings for employee M for the day is of Jun. 30, 2000 is therefore $750.

Figure 4:
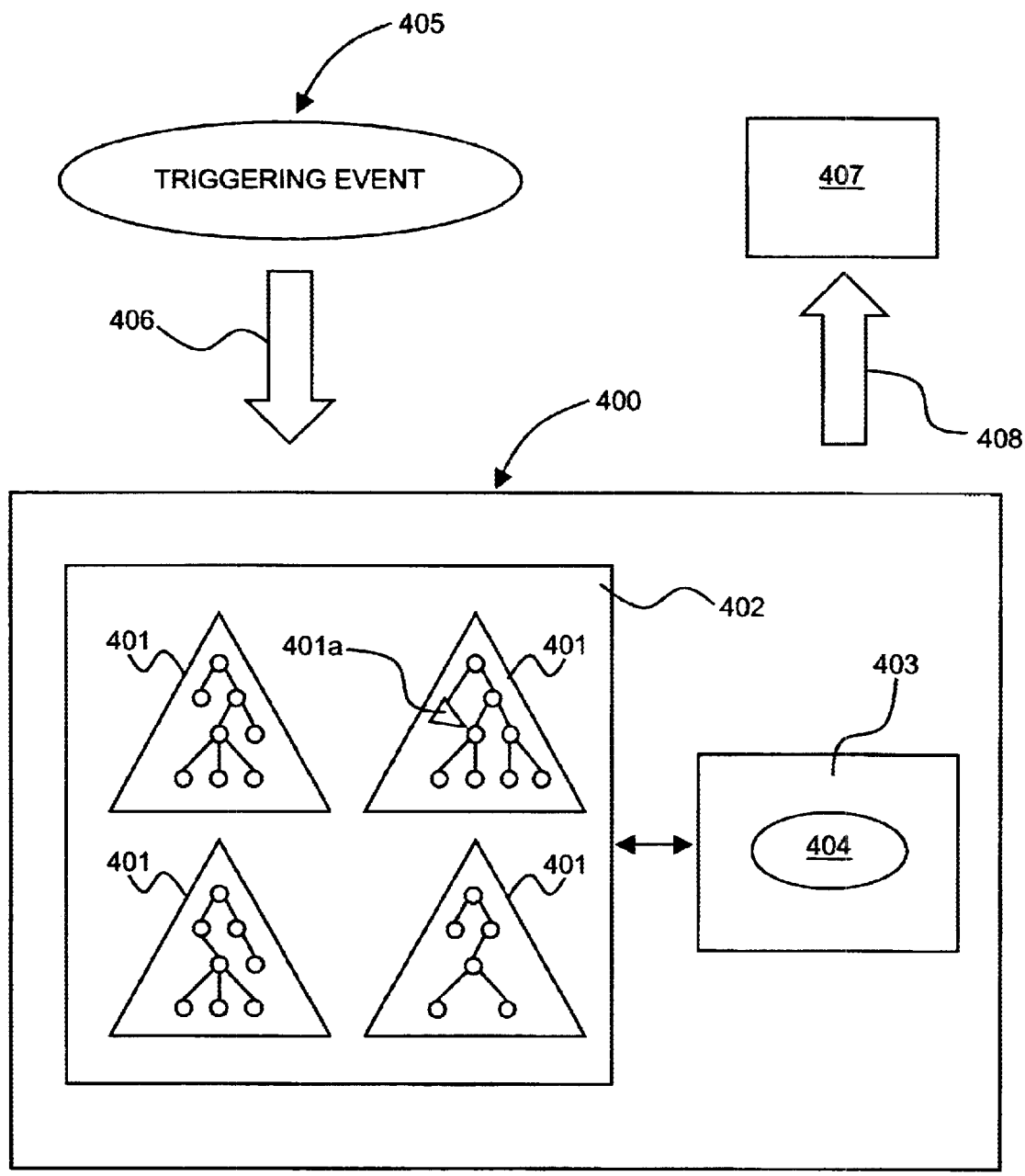
FIG. 4 is a schematic diagram of a rating engine system operating with several decision operation trees according to embodiments of the present invention.

FIG. 4 generally depicts how one or more different DO Trees 401 can be incorporated into system 400 according to the present invention. The DO Trees are stored in a storage medium 402, such as a hard drive or other suitable medium known in the art, and electronically accessed and utilized by software 404 being run by the system's processor 403. In operation, a triggering event 405 is, transmitted 406 to the system 400. In response to the triggering event 405, the software 404 "wakes up" the appropriate DO Tree 401 and passes relevant Event parameters to a DO Tree sub-process. Any Actions dictated by the relevant DO Tree which requires external implementation (such as a provisioning signal to a remote service system) can be transmitted 408 to an external system 407. As shown in the figure, a DO Tree according to the present invention can internally refer 401a to another DO Tree (such as by passing values to a second root node, i.e., the root node of another tree) such that one tree can essentially be represented as a sub-tree of another.

Figure 5:
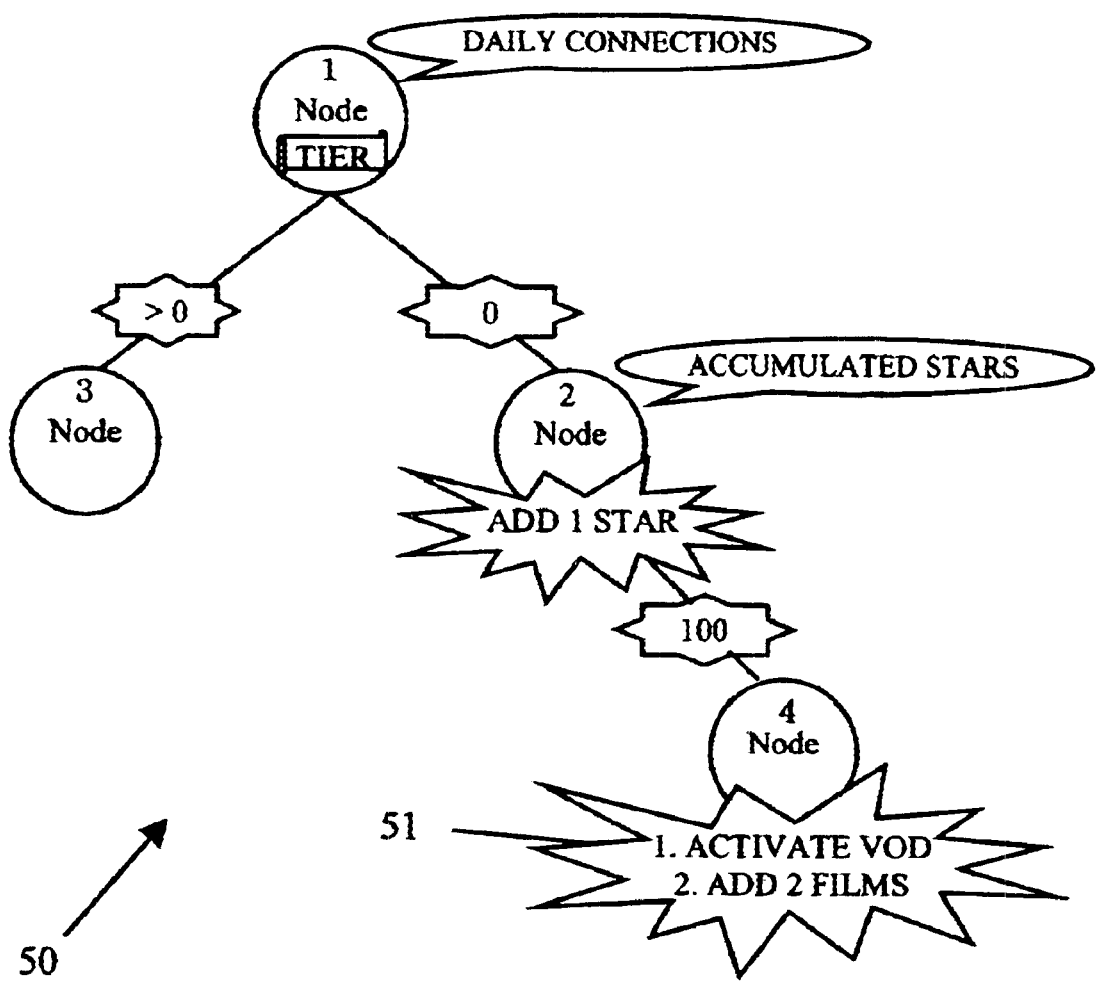
FIG. 5 is a schematic diagram of a decision operation tree according to embodiments of the present invention.

FIG. 5 depicts an exemplary embodiment of the present invention wherein a DO Tree 50 is used to implement a decision that includes non-economic actions. The decision rule implemented by the DO Tree 50 in FIG. 5 is "for every calendar day that a customer connects to the Internet service he receives a Star; when he reaches 100 Stars he receives a free service of 'Video on demand' with 2 free films." Also of note with respect to FIG. 5 is that Node 4 contains two Actions 51 which are prioritized (1 and 2). In embodiments of the present invention, such prioritized actions within a single node are carried out sequentially.

As indicated above, as opposed to Table-based rating systems of the prior art, DO Tree based systems according to the present invention support not only rating generation but also act as a business decision engines. In this manner, it will be readily appreciated by one of ordinary skill in the art that such an engine can perform many business actions, including rating, hierarchy distribution, revenue sharing, provisioning, disconnecting, loyalty programs, as well as calculate commissions, discounts, and bonuses.

Figure 6:
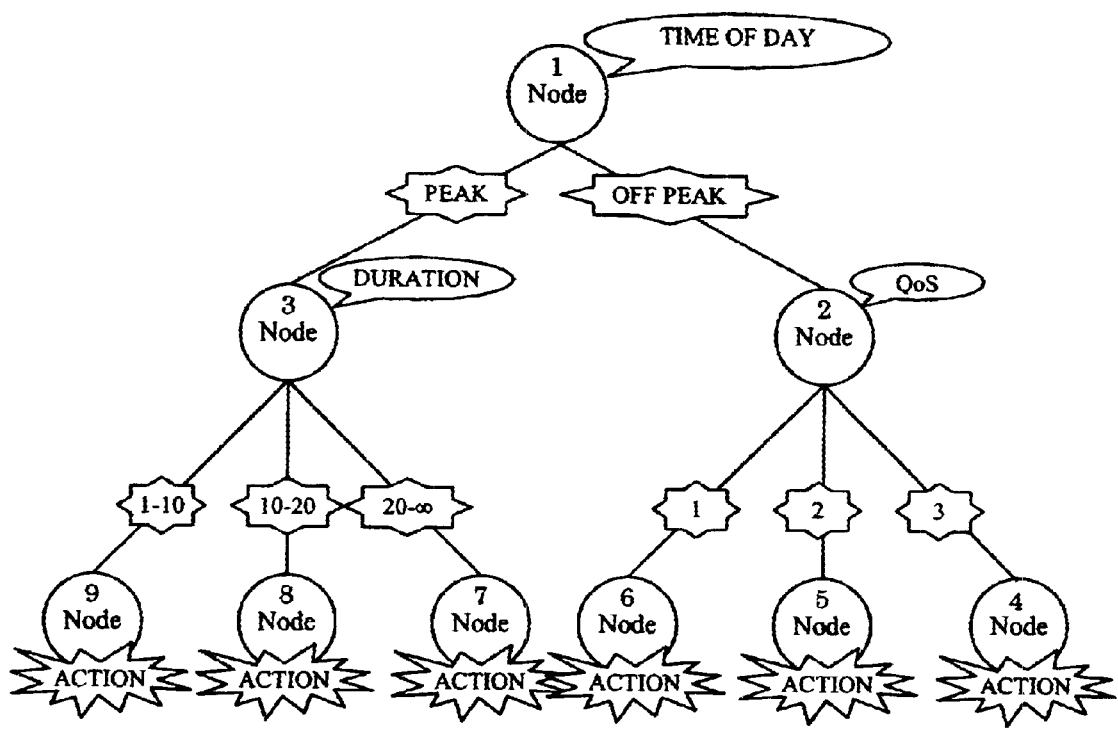
FIG. 6 is a schematic diagram of a decision operation tree display according to embodiments of the present invention.

Furthermore, the advantages over a Table based rating engine include:
1. Attribute independence—A Node can refer to any attribute, that may be an Event attribute or calculated attribute or any data stored, for example accumulations from previous sessions.
2. Action independence—A Node can trigger any number of actions on the system, whether it is rating, provisioning, discount and bonus calculations, messaging, accumulation, etc.
3. Intuitive Visual Representation—The DO Tree visualizes the rating plan hierarchy and gives a "bird's eye view" of the rating scheme and the Decision outcomes. Thereby the business rule logic can easily be depicted in printed, algorithmic form.
4. Event driven—The DO Tree is part of an event-based system and is only triggered when a predefined event occurs. That allows linkage of all system operation to pre-defined Events. For example sending a message when an event of "service about to expire" is triggered.
5. No need for additional Business Decision implementation for actions that are not Economic (rating)—Since the DO Tree may contain actions of various types, that are not only economic (rating) actions—implementation of other Business decisions do not require additional or separate implementation.
6. Any Level Nodes Action—While a table fairly implements an action for a specific combination of attributes, the DO Tree can separate actions to different Node levels. An action can take place in every Node disregarding its level. In this way, the company can handle sophisticated business logic without the need to summarize actions. An exemplary situation would be where the business rule logic dictates that an Internet Access service should be charged with $0.50 per session and in addition will have usage charges of $1 per Peak hours and $0.80 per Off-peak hours. DO Trees according to the present invention would allow an action in the root Node of a $0.50 flat charge and two Branches leading to the corresponding values for peak and off peak. When prior art rating tables are used to model the same case, the usage table should have a rate representing both discussed rates or have a special rate outside the table (through a special system coding). This is a much more complicated model for a fairly simple business plan.
7. Better Performance—The Do tree Engine requires less operations to execute the Business Decision Operation in relation to Rating Table Engines. Consider the Do Tree depicted in FIG. 6. Implementing the presented Do Tree in a Rate Table (Generation 1) will require 2 different tables (Due to the fact that there is a relation between 'Time Of Day' and 'QoS' and another relation between 'Time Of Day' and 'Duration') which are usually out of the scope of regular systems. There is another possibility to define 3 dimensional table but then there should be another dummy column value none for dimensions QoS and Duration (because there is no relation between the two). The outcome will be a cumbersome Rate Table of 2*4*4=32 Table cells (there will be 6 cells that will have an action and other that will be empty).

As the first generation Rate Table is far from being a good solution for this kind of Business decision it can be implemented in the second generation Rate Table. This kind of solution will implement 6 rules (according to the number of actions). The problem of this solution is performance. In worst case, all 6 rules will be scanned before finding the right rule to apply, where the DO Tree will require only 2 steps to find the right action! Generally speaking, if 'n' is the number of Business rules then the Rate Table will require $O(n)$ steps while the Do Tree will require only $O(\log(n))$ steps—an exponential difference.
8. Reusability—derived from the logical definition of a tree, when linking two or more trees the outcome will also be a tree, which means, that one encapsulated tree may be re-used in one or more high level trees.

As the advantages of using Decision Operation Trees in a business environment have been recited herein, it should be readily apparent to one skilled in the art that the DO Trees could implement any process that a Rating Table can. That is, none of the current capabilities of a Rating table is lost when shifting to DO Trees.

Various modifications of the embodiments herein disclosed will be readily apparent to one skilled in the art after reading the above. Any and all such modifications are intended to be covered by the application as claimed.

What is claimed is:
1. A method which provides decision making output according to the occurrence of a predetermined event, comprising the steps of:
   starting at a root node, designating the root node as a current node;
   performing actions associated with the current node, if any; and
   branching to one or more descendant nodes according to parameters of the current node, said parameters including a decision attribute and a branching type; designating said one or more descendant nodes which were branched to as the current node; and
   wherein said action performing step and said branching step are repeated until said current node has no descendent nodes.
2. The method according to claim 1, wherein said decision making output is provided for a customer care and billing or operation support system.
3. The method according to claim 1, wherein said decision attribute is of a type selected from the group consisting of a pre-defined attribute, and a cutomized attribute.
4. The method according to claim 1, wherein said decision attribute represents an accumulation of value of an attribute.
5. The method according to claim 1, wherein said action is selected from the group consisting of initializing a user defined script, performing a calculation, and passing values to a second root node and designating the second root node as the current node.
6. The method according to claim 1, wherein said steps of said method are performed automatically by a computer.
7. A system for providing decision making output according to the occurrence of a predetermined event comprising a processor and a storage medium; said storage medium storing one or more decision operation trees which dictate actions to be taken in response to the occurrence of an associated triggering event, said processor running software designed to select and perform functions of a decision operation tree associated with said triggering event; wherein said software operates on said selected decision operation tree to generate actions by:
   starting at a root node of said decision operation tree, designating the root node as a current node;
   performing actions associated with the current node, if any; and branching to one or more descendent nodes according to parameters of the current node, said parameters including a decision attribute and a branching type, designating said one or more descendent nodes which were branched to as the current node; and wherein said action performing and said branching are repeated by said software until said current node has no descendent nodes.

8. The system for providing decision making output according to claim 7, wherein said system is a customer care billing or operations support system.

9. The system for providing decision making output according to claim 7, wherein said decision attribute is of a type selected from the group consisting of a pre-defined attribute, and a customized attribute.

10. The system for providing decision making output according to claim 7, wherein said decision attribute represents an accumulation of value of an attribute.

11. The system for providing decision making output according to claim 7, wherein said action is selected from the group consisting of initializing a user defined script, performing a calculation, and passing values to a second root node and designating the second root node as the current node.

12. The system for providing decision making output according to claim 7, wherein one of said actions associated with a given node may be dependent upon one or more other actions associated with said given node.

13. A method for automating decision making, which is initiated upon an occurrence of a predetermined event and which then initiates actions in response to said occurrence, comprising the steps of:

identifying a plurality of decision attributes relating to said event;

prioritizing said decision attributes; and organizing said decision attributes into a tree comprising a plurality of nodes connected in a progressive manner from a root node, said nodes being logically connected by branches, and each of said nodes optionally being associated with one or more actions;

wherein said tree is adapted to be followed to initiate said actions according to the steps of:

starting at the root node, designating the root node as a current node;

performing actions associated with the current node, if any; and branching to one or more subsequent nodes according to parameters of the current node, said parameters including said decision attribute and a branching type, designating said one or more subsequent nodes which were branched to as the current node; and repeating said action performing step and said branching step are repeated until said current node has no subsequent nodes.

14. The method according to claim 13, wherein said decision making output is provided for a customer care and billing or operation support system.

15. The method according to claim 13, wherein said decision attribute is of a type selected from the group consisting of a pre-defined attribute, and a customized attribute.

16. The method according to claim 13, wherein said decision attribute represents an accumulation of value of an attribute.

17. The method according to claim 13, wherein said action is selected from the group consisting of initializing a user defined script, performing a calculation, and passing values to a second root node and designating that second root node as the current node.

18. The method according to claim 13, wherein said steps of said method are performed automatically by a computer.

19. A method for displaying a decision making rules set for use in initiating actions in response to an occurrence of a predetermined event, the method comprising the steps of:

identifying a plurality of decision attributes relating to said event;

prioritizing said decision attributes; and organizing said decision attributes into a tree comprising a plurality of nodes connected in a progressive manner from a root node, said nodes being logically connected by branches, and each of said nodes optionally being associated with one or more actions; wherein said organizing step includes manipulating visual representations of said nodes and said branches.

20. The method according to claim 19, wherein said visual representations of each of said nodes includes indications of any particular decision attributes associated with said each of said nodes.

21. The method according to claim 19, wherein said visual representations of each of said nodes includes indications of any particular actions associated with said each of said nodes.

22. The method according to claim 19, wherein after the occurrence of said predetermined event a representation of a logical progression through said nodes and branches of said tree is displayed.

* * * * *